US012730430B2

(12) United States Patent
Liu et al.

(10) Patent No.: US 12,730,430 B2
(45) Date of Patent: Sep. 8, 2026

(54) METHOD FOR PREDICTING THERMAL ERROR OF SPINDLE OF COMPUTER NUMERICAL CONTROL MACHINE TOOL BASED ON TWIN FEATURE TRANSFERRING OF VIRTUAL-REAL PROTOTYPE

(71) Applicant: Zhejiang University, Hangzhou (CN)

(72) Inventors: Zhenyu Liu, Hangzhou (CN); Jiacheng Sun, Hangzhou (CN); Chan Qiu, Hangzhou (CN); Guodong Sa, Hangzhou (CN); Jianrong Tan, Hangzhou (CN)

(73) Assignee: Zhejiang University, Hangzhou (CN)

( * ) Notice: Subject to any disclaimer, the term of this patent is extended or adjusted under 35 U.S.C. 154(b) by 309 days.

(21) Appl. No.: 18/699,258

(22) PCT Filed: Dec. 19, 2023

(86) PCT No.: PCT/CN2023/139877
§ 371 (c)(1),
(2) Date: Apr. 5, 2024

(87) PCT Pub. No.: WO2024/244412
PCT Pub. Date: Dec. 5, 2024

(65) Prior Publication Data

US 2025/0238013 A1 Jul. 24, 2025

(30) Foreign Application Priority Data

Jun. 1, 2023 (CN) ........................ 202310643624.4

(51) Int. Cl.
*G05B 19/4065* (2006.01)
*G05B 19/404* (2006.01)

(52) U.S. Cl.
CPC ....... *G05B 19/4065* (2013.01); *G05B 19/404* (2013.01); *G05B 2219/39192* (2013.01)

(58) Field of Classification Search
CPC .............. G05B 19/404; G05B 19/4065; G05B 2219/39192
See application file for complete search history.

(56) References Cited

U.S. PATENT DOCUMENTS 11,680,916 B2 * 6/2023 Konishi ................ G01N 25/20 700/275
12,197,183 B2 * 1/2025 Brand ................. G05B 19/404
(Continued)

FOREIGN PATENT DOCUMENTS

CN 114896771 A * 8/2022 ............ G06F 30/20

OTHER PUBLICATIONS

WIPO English translation of CN 114896771 (Year: 2022).*
(Continued)

*Primary Examiner* — Alvin H Tan
(74) *Attorney, Agent, or Firm* — CM Law LLP; Robert C. Klinger

(57) ABSTRACT

A method for predicting a thermal error of a spindle of a computer numerical control (CNC) machine tool based on twin feature transferring of a virtual-real prototype, is provided, including: first, building a spindle physical prototype experiment table, and screening temperature sensitive points outside the physical prototype spindle, so as to establish an autoregressive distributed lag model; second, determining a temperature synchronization lag point on the physical prototype spindle corresponding to the temperature sensitive point outside the physical prototype spindle, so as to construct a thermal error analysis model; thereafter, establishing a virtual prototype and transferring the twin feature of the physical prototype, and by integrating a twin coupling
(Continued)

relationship between the physical prototype spindle and the virtual prototype spindle, realizing the thermal error prediction. The present disclosure improves the accuracy of the thermal error prediction under the condition that it is difficult to arrange sensors on the spindle.

5 Claims, 5 Drawing Sheets

(56) References Cited

U.S. PATENT DOCUMENTS 12,416,906 B2 * 9/2025 Brand .................. G05B 19/404
2023/0315043 A1 * 10/2023 B R .................. G05B 19/4065
700/175

OTHER PUBLICATIONS

Lu et al, “Digital Twin-Driven Thermal Error Prediction for CNC Machine Tool Spindle,” May 14, 2023, Available https://doi.org/10.3390/lubricants11050219 (Year: 2023).*

* cited by examiner

METHOD FOR PREDICTING THERMAL ERROR OF SPINDLE OF COMPUTER NUMERICAL CONTROL MACHINE TOOL BASED ON TWIN FEATURE TRANSFERRING OF VIRTUAL-REAL PROTOTYPE

CROSS-REFERENCE TO RELATED APPLICATION

This patent application is a national stage of International Application No. PCT/CN2023/139877, filed on Dec. 19, 2023, which claims the benefit and priority of Chinese Patent Application No. 202310643624.4 filed with the China National Intellectual Property Administration on Jun. 1, 2023, the disclosure of which is incorporated by reference herein in its entirety as part of the present application.

TECHNICAL FIELD

The present disclosure belongs to the technical field of precision machining machine tools, and relates to a method for predicting a thermal error of a spindle of a computer numerical control (CNC) machine tool, in particular to a method for predicting a thermal error of a spindle of a CNC machine tool based on twin feature transferring of a virtual-real prototype.

BACKGROUND

With the rapid development of the manufacturing industry and the rapid growth of production demand for precision parts, higher requirements are put forward for the machining accuracy of a CNC machine tool. In the actual machining process of the CNC machine tool, a geometric error, a thermal error and an error resulted from cutting forces have an impact on the machining accuracy of the machine tool. Among many error factors, the thermal error resulted from factors such as bearing friction heat generation and environmental temperature accounts for 40% to 70% of the total errors of the machine tool, which is the most important factor influencing the machining accuracy of the machine tool. A spindle is the core component that determines the machining accuracy of the machine tool. A large amount of heat generated when the machine tool operates at a high speed will result in problems such as a drift of the spindle rotation center and an increase of the turning radius. Predicting the thermal error of the spindle of the machine tool can provide data reference for the subsequent error compensation stage, which is of great significance.

Prediction of the thermal error of the spindle of the machine tool mainly includes three steps: selecting a temperature sensitive point, establishing a thermal error prediction model and calculating model prediction performance. In the existing research, several temperature sensors arranged outside the spindle are selected as temperature sensitive points; the selected temperature sensitive points are used to model the thermal error of the spindle; the predicted value of the model is compared with the real value to calculate the accuracy of the prediction method. However, the existing methods for predicting the thermal error of the spindle of the machine tool have the following problems: (1) the space near the spindle of the machine tool is limited, so that it is impossible to arrange more temperature sensors for screening temperature sensitive points; (2) the spindle end of the machine tool is tightly wrapped, so the thermal error of the spindle cannot be measured by a displacement sensor for modeling the thermal error. Under the condition that it is difficult to arrange sensors on the spindle of the CNC machine tool, the prediction accuracy of the existing methods for predicting the thermal error of the spindle cannot be guaranteed.

SUMMARY

In order to solve the problems existing in the background, the present disclosure provides a method for predicting a thermal error of a spindle of a CNC machine tool based on twin feature transferring of a virtual-real prototype, which is used for improving the prediction accuracy of the thermal error of the spindle of the CNC machine tool and calculating the prediction accuracy of the method for predicting the thermal error of the spindle of the computer machine tool without arranging a displacement sensor on the machine tool. The present disclosure can overcome the shortcomings of the existing methods, and improve the accuracy of the thermal error prediction of the spindle under the condition that it is difficult to arrange sensors on the spindle of the CNC machine tool.

In order to achieve the above purpose, the technical solution of the present disclosure include:

- S1: building a spindle physical prototype experiment table, uniformly arranging a plurality of measuring points outside a physical prototype spindle, screening and obtaining temperature sensitive points outside the physical prototype spindle from the plurality of measuring points, and establishing an autoregressive distributed lag model of the thermal error;
- S2: determining a temperature synchronization lag point on the physical prototype spindle corresponding to the temperature sensitive point outside the physical prototype spindle, establishing a temperature relationship between the temperature sensitive point outside the physical prototype spindle and the temperature synchronization lag point on the physical prototype spindle according to a grey system theory and denoting the temperature relationship as a first temperature relationship, and obtaining a thermal error analysis model of the physical prototype spindle with the temperature of the temperature synchronization lag point on the physical prototype spindle as a thermal error feature according to the first temperature relationship;
- S3: establishing a virtual prototype model of the machine tool, taking the temperature synchronization lag point on the physical prototype spindle as a twin feature and transferring and mapping the temperature synchronization lag point to the virtual prototype spindle of the machine tool to obtain a temperature transferring point of the virtual prototype spindle, and then determining a position of each temperature sensitive point outside the virtual prototype spindle, and then establishing a temperature relationship between the temperature transferring point on the virtual prototype spindle and each temperature sensitive point outside the virtual prototype spindle according to the grey system theory and denoting the temperature relationship as a second temperature relationship; and thereafter, by integrating a twin coupling relationship between the physical prototype spindle and the virtual prototype spindle, the thermal error analysis model of the physical prototype spindle and the second temperature relationship, obtaining a thermal error prediction model of the spindle of the CNC machine tool based on twin feature transferring of the virtual-real prototype;

S4: adjusting parameters of the physical prototype experiment table to keep running in the same working condition as the machine tool all the time, fusing the thermal error of the physical prototype spindle measured by a displacement sensor with the twin coupling relationship in S3 to obtain a real value of the thermal error of the spindle of the machine tool; thereafter, according to the temperature sensitive points outside the virtual prototype spindle, arranging a temperature sensor at the corresponding position outside the spindle of the machine tool, inputting acquired temperature data into the thermal error prediction model of the spindle of the CNC machine tool in real time to obtain a predicted value of the thermal error of the spindle of the machine tool; finally, calculating prediction accuracy according to the real value and the predicted value of the thermal error of the spindle of the machine tool, and optimizing the prediction model of the thermal error of the spindle of the CNC machine tool according to the prediction accuracy, so as to obtain a more accurate predicted value of the thermal error of the spindle of the machine tool.

Compared with the prior art, the present disclosure has the following beneficial effects.

1) In the present disclosure, fewer temperature sensors are arranged on the machine tool, which is suitable for the arrangement of temperature sensors of the machine tool with limited space near the spindle.

2) According to the present disclosure, based on twin feature transferring of the virtual-real prototype, the established thermal error prediction model of the spindle of the machine tool is not influenced by structures between the physical prototype experiment table and the machine tool and different arrangement positions of the temperature sensors, and the prediction accuracy is high.

3) In the present disclosure, the displacement sensor do not need to be arranged on the machine tool when the prediction accuracy of the thermal error model of the spindle of the machine tool is calculated, thus solving the problem of calculating the accuracy of the traditional method for predicting the thermal error of the spindle of the machine tool.

DETAILED DESCRIPTION OF THE EMBODIMENTS

The present disclosure will be further explained with reference to the attached drawings and specific examples.

Figure 1:
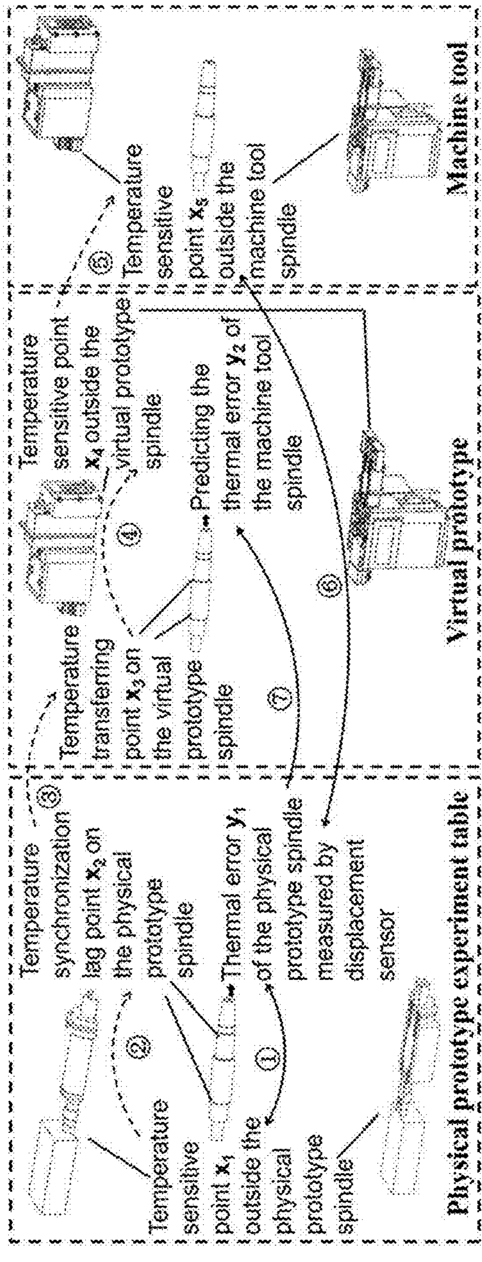
FIG. 1 is an explanatory diagram of key parameters of the thermal error prediction according to the present disclosure.
Figure 2:
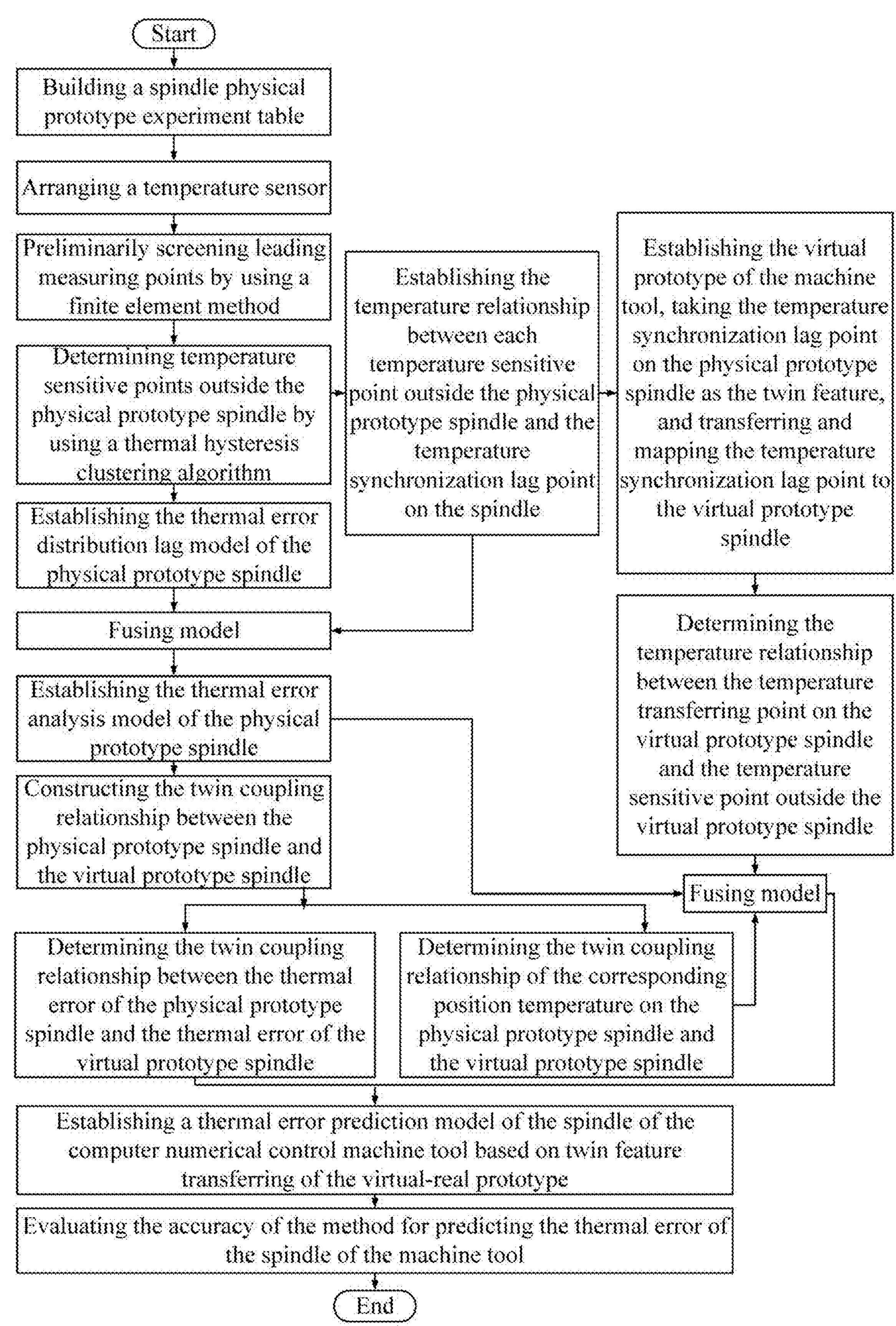
FIG. 2 is a flow chart of a method according to the present disclosure.

As shown in FIG. 1 and FIG. 2, the method includes the following steps S1-S4.

S1: a spindle physical prototype experiment table is built, a plurality of measuring points are uniformly arranged outside a physical prototype spindle, temperature sensitive points outside the physical prototype spindle are screened from the measuring points, and an autoregressive distributed lag model of the thermal error is established.

S1 specifically includes:

S11: building the spindle physical prototype experiment table, uniformly arranging 10-20 measuring points outside the physical prototype spindle, and arranging a corresponding temperature sensor at each measuring point to record the temperature change of each measuring point;

S12: establishing a finite element model of the physical prototype experiment table, and preliminarily screening out leading measuring points outside the physical prototype spindle in which a temperature sudden change response is faster than a thermal error sudden change response at a sudden change of the working condition from the measuring points based on the finite element model of the physical prototype experiment table by simulating a sudden change process of the working condition; and S13: using a thermal hysteresis clustering algorithm to select several leading measuring points from the leading measuring points outside the physical prototype spindle as the temperature sensitive points outside the physical prototype spindle, and by integrating a thermal hysteresis effect and a self-memory of the thermal error, establishing an autoregressive distributed lag model of the thermal error.

Figure 3:
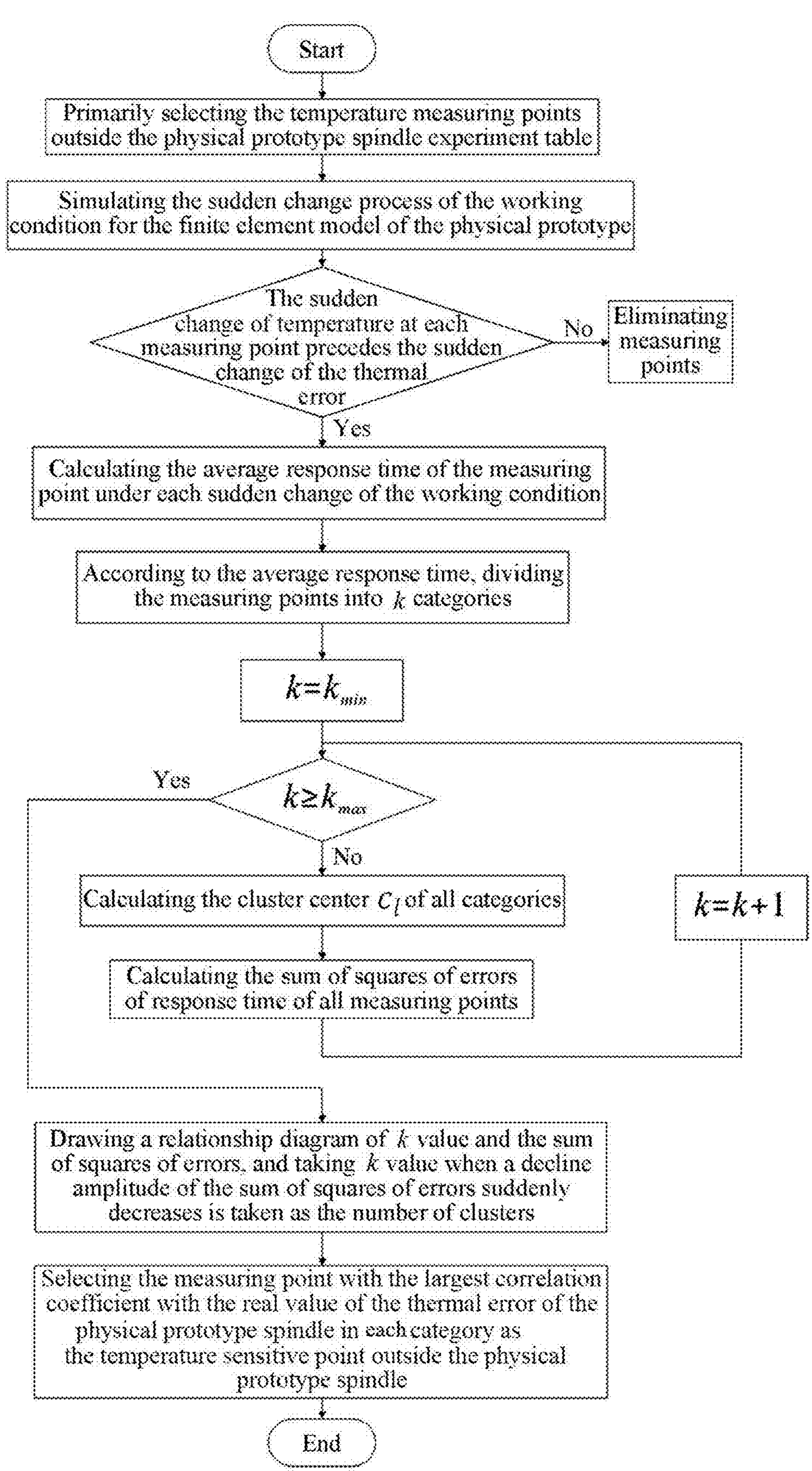
FIG. 3 is a flow chart of selecting temperature sensitive points outside a physical prototype spindle.

As shown in FIG. 3, using the thermal hysteresis clustering algorithm to select several leading measuring points from the leading measuring points outside the physical prototype spindle as the temperature sensitive points outside the physical prototype spindle, specifically includes the following steps.

First, average response time $\Delta t_r$ of each leading measuring point under each sudden change of the working condition is calculated in sequence, r=1, 2, . . . s, where s indicates the number of the leading measuring points. The calculation formula is as follows:

$$\Delta t_r = \frac{1}{N}\sum_{q=1}^{N}\Delta t_{rq}$$

where $\Delta t_{rq}$ indicates the response time of the r-th leading measuring point under the q-th working condition, q=1, 2, . . . N, where N indicates the number of sudden changes of the working condition.

Thereafter, according to the average response time, leading measuring points are divided into k categories, $k \in [k_{min}, k_{max}]$, where $k_{min}$ indicates the minimum number of clusters, and $k_{max}$ indicates the maximum number of clusters, all of which are determined according to experience. It is uniformly divided into k categories between the maximum average response time $\Delta t_{max}$ and the minimum average response time $\Delta t_{min}$, and the category of the leading measuring points is determined according to the following formula:

$$l = \left\lceil \frac{\Delta t_r - \Delta t_{min}}{\Delta t_{max} - \Delta t_{min}} \right\rceil$$

Thereafter, an average value of the average response time of all leading measuring points in each category of leading measuring points is taken as a cluster center $c_l$ of this category of leading measuring points, l=1, 2, . . . , k, and then a sum of squares of errors under the current number of clusters is calculated according to the cluster centers of various categories of leading measuring points. The number of clusters k is changed. A sum of squares of errors under different numbers of clusters, that is, the sum of squares of errors of the response time of all measuring points under different values of k, is calculated and obtained. In the specific implementation, it is assumed that $k=k_{min}$, and the sum of squares of errors of the response time of all measuring points when the measuring points are divided into $k_{min}$ categories is calculated. The value of k increases until $k=k_{max}$, and the sums of squares of errors of the response time of all measuring points are obtained at different values of k in sequence. Thereafter, a relationship diagram between the number of clusters k and the corresponding sum of squares of errors is drawn, and the number of clusters when a decline amplitude of the sum of squares of errors in the relationship diagram suddenly decreases is taken as the number of target clusters; according to the number of target clusters, leading measuring points are clustered to obtain target clusters, and the most correlated leading measuring point in each target cluster is taken as the temperature sensitive point outside the physical prototype spindle. In the specific implementation, specifically, the correlation is the correlation between the temperature of each leading measuring point and the real value of the thermal error of the physical prototype spindle.

S2: a temperature synchronization lag point on the physical prototype spindle corresponding to the temperature sensitive point outside the physical prototype spindle is determined, a temperature relationship between the temperature sensitive point outside the physical prototype spindle and the temperature synchronization lag point on the physical prototype spindle is established according to a grey system theory and the temperature relationship is denoted as a first temperature relationship, and a thermal error analysis model of the physical prototype spindle, with the temperature of the temperature synchronization lag point on the physical prototype spindle as a thermal error feature, is constructed and obtained according to the first temperature relationship.

Figure 4:
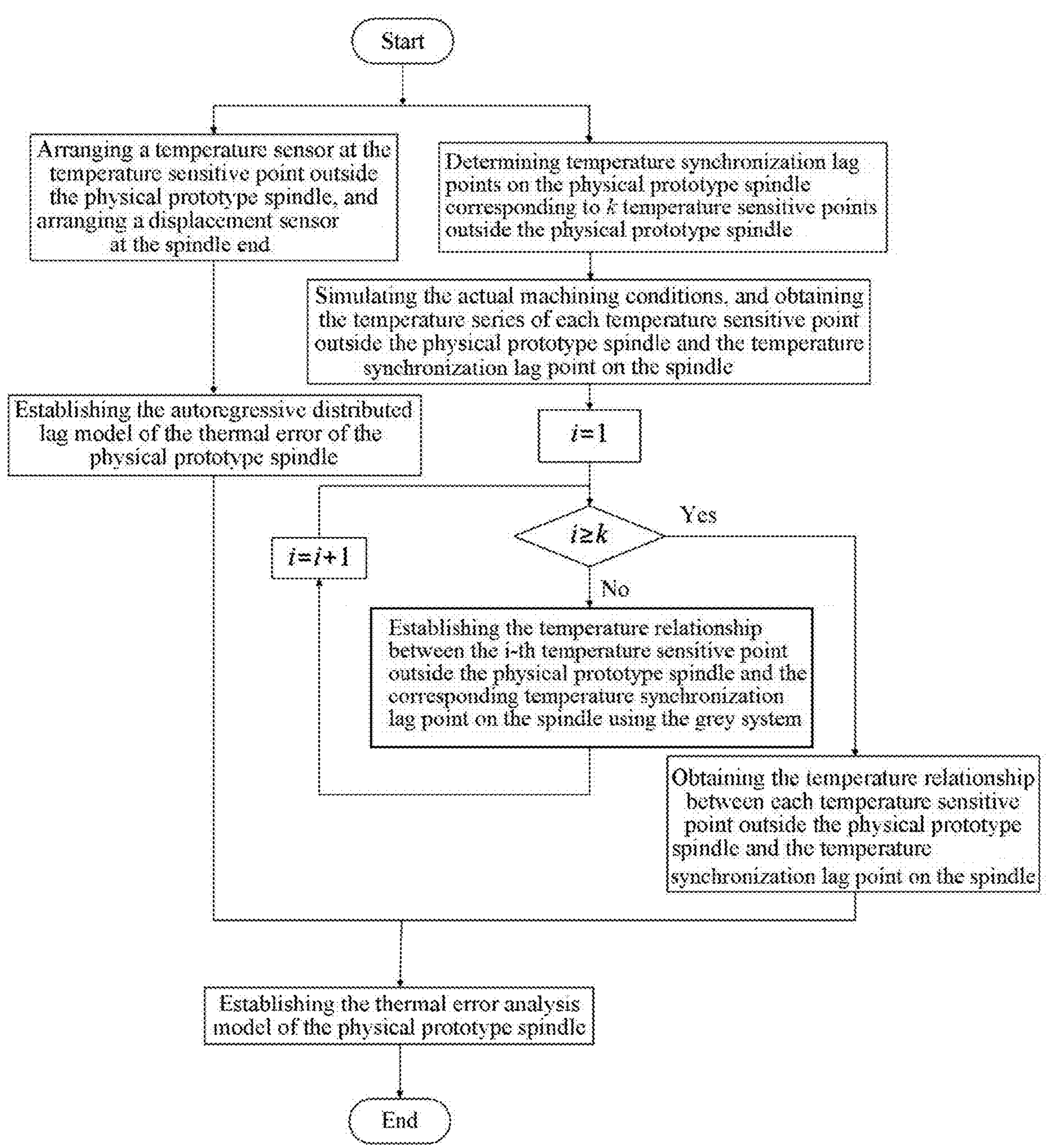
FIG. 4 is a flow chart of establishing a thermal error analysis model of a physical prototype spindle.

As shown in FIG. 4, S2 specifically includes the following steps S21-S23.

S21: the sudden change process of the working condition is simulated by using a finite element method, and the temperature synchronization lag point of each temperature sensitive point outside the physical prototype spindle is found on the physical prototype spindle. The temperature synchronization lag point refers to two points where the ratio of average response time of the temperature sensitive point outside the physical prototype spindle and that of the temperature synchronization lag point on the physical prototype spindle falls within the allowable range (usually, δ=0.05) in all sudden changes of the working condition. The temperature synchronization lag point on the physical prototype spindle corresponding to the temperature sensitive point outside the physical prototype spindle is determined according to the following formula:

$$\left|1-\frac{\Delta t_2}{\Delta t_1}\right| \le \delta$$

where $\Delta t_1$ and $\Delta t_2$ are the average response time of the temperature sensitive point outside the physical prototype spindle and the temperature synchronization lag point on the physical prototype spindle, respectively.

S22: a multi-condition limited temperature sequence of each temperature sensitive point outside the physical prototype spindle and the temperature synchronization lag point on the physical prototype spindle is intercepted, and based on the multi-condition limited temperature sequence, the temperature relationship between the temperature sensitive point outside the physical prototype spindle and the temperature synchronization lag point on the physical prototype spindle is determined by using the grey system theory and the temperature relationship is denoted as the first temperature relationship.

S23: the first temperature relationship is fused with the existing autoregressive distributed lag model of the thermal error, and the thermal error analysis model of the physical prototype spindle, with the temperature of the temperature synchronization lag point on the physical prototype spindle as the thermal error feature, is constructed and obtained. The formula is as follows:

$$Y_g = a_0 + \sum_{i=1}^{m} a_i Y_{g-i} + \sum_{j=1}^{p} \sum_{i=0}^{n} \beta_{ji} \hat{x}_{j1}^{0}(g-i) + \varepsilon_g$$

$$\hat{x}_{j1}^{(0)}(g-i) = \left[x_{j1}^{(0)}(1) - \frac{1}{a_j}\cdot b_{j2} x_{j2}^{(1)}(g-i)\right] e^{-a(g-i-1)} - \left[x_{j1}^{(0)}(1) - \frac{1}{a_j}\cdot b_{j2} x_{j2}^{(1)}(g-1-i)\right] e^{-a(g-i-2)} + \frac{1}{a_j}\cdot b_{j2}\left[x_{j2}^{(1)}(g-i) - x_{j2}^{(1)}(g-1-i)\right]$$

where $Y_g$ indicates a predicted value of the thermal error of the spindle of the machine tool at time g, $a_0$ indicates an adjustment coefficient, $a_1$ indicates an i-th lagged variable weight of the thermal error, m indicates an autoregressive order, p indicates the number of exogenous variables, n indicates a distributed lag order, $\varepsilon_g$ indicates white noise, $\beta_{ji}$ indicates an i-th lagged variable weight of the temperature under a j-th exogenous variable, $$\hat{x}_{j1}^{0}(g-i)$$

indicates an i-th-order lagged variable of the temperature, $$x_{j1}^{(0)}(1)$$

indicates a 1-AGO sequence of system temperature characteristic data under a j-th exogenous variable, $a_j$ indicates a development coefficient of a grey system, $b_{j2}$ indicates a driving coefficient, and $$x_{j2}^{(1)}$$

indicates a 1-AGO sequence of related factor data under a j-th exogenous variable.

S3: a virtual prototype model of the machine tool is established, the area with no obvious temperature change is excluded by using the finite element method, the arrangement area of the temperature sensor outside the spindle of the twin machine tool is delineated according to the actual machining environment on this basis, the temperature synchronization lag point on the physical prototype spindle is taken as a twin feature and is transferred and mapped to the virtual prototype spindle of the machine tool one by one to obtain a temperature transferring point of the virtual prototype spindle, and then the position of each temperature sensitive point outside the virtual prototype spindle is determined. Specifically, the virtual prototype of the finite element model of the machine tool is subjected to the same simulation process of the working condition sudden change process as S12. The temperature sensitive points outside the virtual prototype spindle with the same thermal hysteresis effect as the temperature transferring points on the virtual prototype spindle are determined by a binary search method. Thereafter, a temperature relationship between the temperature transferring point on the virtual prototype spindle and each temperature sensitive point outside the virtual prototype spindle is established according to the grey system theory and the temperature relationship is denoted as a second temperature relationship; thereafter, the twin coupling relationship between the temperatures of the corresponding point of the physical prototype spindle and the virtual prototype spindle and the twin coupling relationship between the thermal errors of the spindle are constructed. In this embodiment, the physical prototype spindle and the machine tool spindle are two spindles of the same model. In S12 and S3, the finite element model of the physical prototype and the virtual prototype of the machine tool are subjected to the exactly same working condition sudden change simulation experiment, respectively. Therefore, it is considered that the temperature changes at the corresponding positions on the two spindles are the same. From the point of view of thermo-mechanical analysis, it is known that the thermal error of the spindle is closely related to the temperature change of each position on the spindle. Therefore, the thermal error of the physical prototype spindle and the thermal error of the virtual prototype spindle are always the same.

Finally, by integrating a twin coupling relationship between the physical prototype spindle and the virtual prototype spindle, the thermal error analysis model of the physical prototype spindle and the second temperature relationship, a thermal error prediction model of the spindle of the CNC machine tool based on twin feature transferring of the virtual-real prototype is constructed and obtained.

Figure 5:
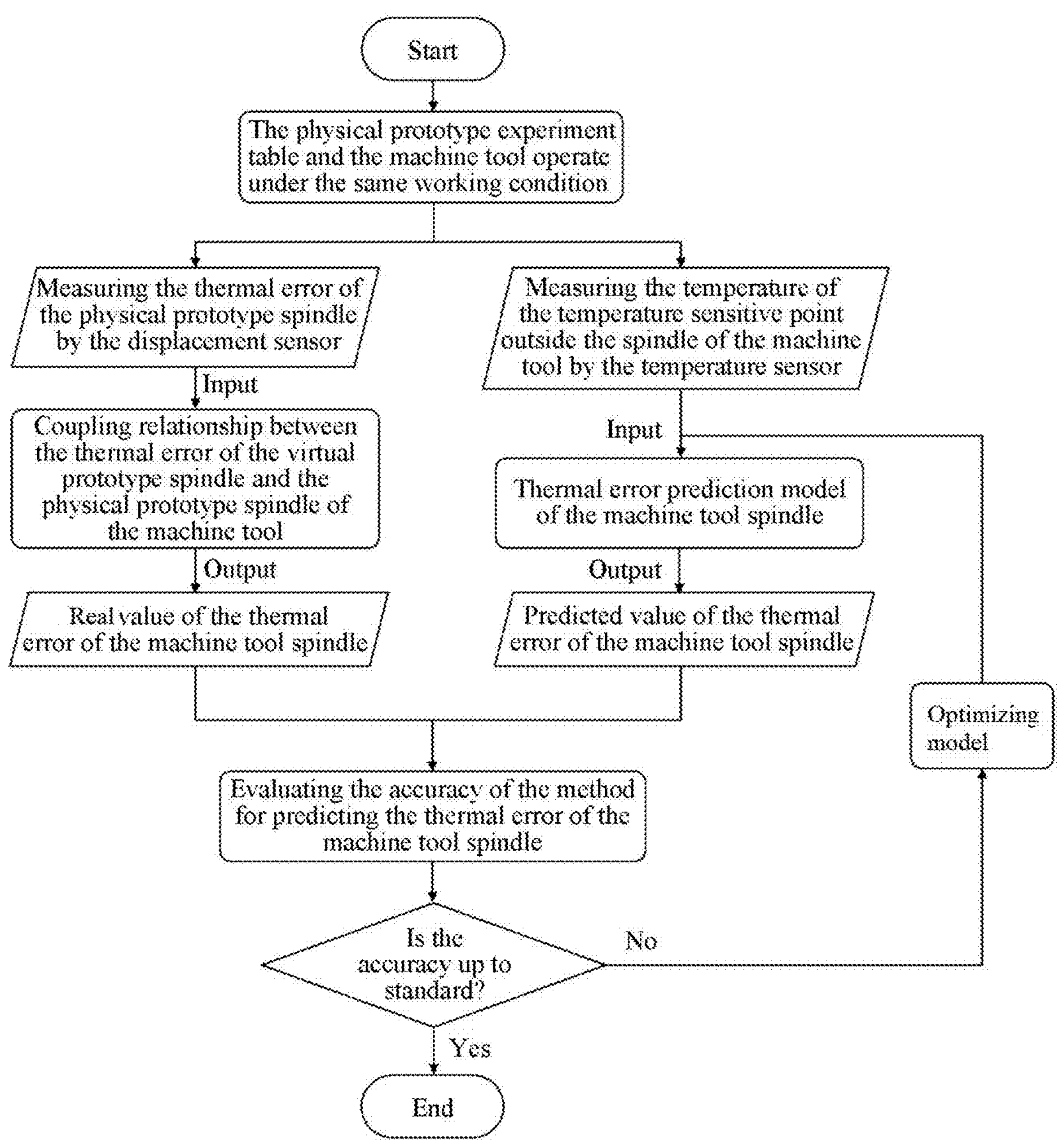
FIG. 5 is a flow chart of performance calculation of a method for predicting a thermal error of a spindle of a CNC machine tool.

S4: as shown in FIG. 5, parameters of the physical prototype experiment table is adjusted to keep running in the same working condition as the machine tool all the time, the thermal error of the physical prototype spindle measured by a displacement sensor is fused with the twin coupling relationship in S3 to obtain a real value of the thermal error of the spindle of the machine tool; thereafter, according to the temperature sensitive points outside the virtual prototype spindle, a temperature sensor is arranged at the corresponding position outside the spindle of the machine tool, the acquired temperature data is input into the thermal error prediction model of the spindle of the CNC machine tool in real time to obtain a predicted value of the thermal error of the spindle of the machine tool; finally, prediction accuracy is calculated according to the real value and the predicted value of the thermal error of the spindle of the machine tool, and the prediction model of the thermal error of the spindle of the CNC machine tool is optimized according to the prediction accuracy, so as to obtain a more accurate predicted value of the thermal error of the spindle of the machine tool. According to the indexes such as a root mean square error, the accuracy of the method for predicting the thermal error of the spindle of the machine tool is calculated. According to the present disclosure, the accuracy of the method for predicting the thermal error of the spindle of the machine tool is calculated in a manner of not arranging a displacement sensor on the machine tool.

Based on the twin coupling relationship established in S3, the thermal error of the physical prototype spindle measured by the displacement sensor in this embodiment is the real value of the thermal error of the spindle of the machine tool.

The above embodiments are only used to explain the present disclosure, rather than limit the present disclosure. Any modification and change made to the present disclosure within the spirit and the scope of protection of claims of the present disclosure fall within the scope of protection of the present disclosure.

What is claimed is:

1. A method for predicting a thermal error of a spindle of a computer numerical control (CNC) machine tool based on twin feature transferring of a virtual-real prototype, comprising:

S1: building a spindle physical prototype experiment table, uniformly arranging a plurality of measuring points outside a physical prototype spindle, screening and obtaining first temperature sensitive points outside the physical prototype spindle from the plurality of measuring points, and establishing a thermal error autoregressive distributed lag model;

S2: determining temperature synchronization lag points on the physical prototype spindle corresponding to the first temperature sensitive points outside the physical prototype spindle, establishing a first temperature relationship between the first temperature sensitive points outside the physical prototype spindle and the temperature synchronization lag points on the physical prototype spindle according to a grey system theory, and obtaining a thermal error analysis model of the physical prototype spindle with temperatures of the temperature synchronization lag points on the physical prototype spindle as a thermal error feature according to the first temperature relationship;

S3: establishing a virtual prototype model of the CNC machine tool, taking the temperature synchronization lag points on the physical prototype spindle as a twin feature and transferring and mapping the temperature synchronization lag points to an virtual prototype spindle of the CNC machine tool to obtain temperature transferring points of the virtual prototype spindle, and then determining second temperature sensitive points outside the virtual prototype spindle with a same thermal hysteresis effect as the temperature transferring points on the virtual prototype spindle by a binary search method, and then establishing a second temperature relationship between the temperature transferring points on the virtual prototype spindle and the second temperature sensitive points outside the virtual prototype spindle according to the grey system theory; and by integrating a twin coupling relationship between the physical prototype spindle and the virtual prototype spindle, the thermal error analysis model of the physical prototype spindle and the second temperature relationship, obtaining a thermal error prediction model of the spindle of the CNC machine tool based on twin feature transferring of the virtual-real prototype;

S4: adjusting parameters of a physical prototype experiment table to keep running in a same working condition as the CNC machine tool all the time, fusing a thermal error of the physical prototype spindle measured by a displacement sensor with the twin coupling relationship in S3 to obtain a real value of the thermal error of the spindle of the CNC machine tool; arranging temperature sensors at corresponding positions outside the spindle of the CNC machine tool according to the second temperature sensitive points outside the virtual prototype spindle, inputting acquired temperature data into the thermal error prediction model of the spindle of the CNC machine tool in real time to obtain a predicted value of the thermal error of the spindle of the CNC machine tool; finally, calculating prediction accuracy according to the real value and the predicted value of the thermal error of the spindle of the CNC machine tool, and optimizing the prediction model of the thermal error of the spindle of the CNC machine tool according to the prediction accuracy, so as to obtain a more accurate predicted value of the thermal error of the spindle of the CNC machine tool.

2. The method for predicting the thermal error of the spindle of the CNC machine tool based on twin feature transferring of the virtual-real prototype according to claim 1, wherein S1 comprises:

S11: building the spindle physical prototype experiment table, uniformly arranging 10-20 measuring points outside the physical prototype spindle, and arranging a corresponding temperature sensor at each measuring point;

S12: establishing a finite element model of the physical prototype experiment table, and preliminarily screening out leading measuring points outside the physical prototype spindle in which a temperature sudden change response is faster than a thermal error sudden change response at a sudden change of the working condition from the measuring points based on the finite element model of the physical prototype experiment table by simulating a sudden change process of the working condition;

S13: using a thermal hysteresis clustering algorithm to select several leading measuring points from the leading measuring points outside the physical prototype spindle as the first temperature sensitive points outside the physical prototype spindle, and by integrating a thermal hysteresis effect and thermal error self-memory, establishing the thermal error autoregressive distributed lag model.

3. The method for predicting the thermal error of the spindle of the CNC machine tool based on twin feature transferring of the virtual-real prototype according to claim 2, wherein in S13, using the thermal hysteresis clustering algorithm to select several leading measuring points from the leading measuring points outside the physical prototype spindle as the first temperature sensitive points outside the physical prototype spindle, comprises:

first, calculating average response time of each leading measuring point under each sudden change of the working condition in sequence; thereafter, according to the average response time, dividing the leading measuring points into k categories, taking an average value of average response time of all leading measuring points in each category of leading measuring points as a cluster center of this category of leading measuring points, and then calculating a sum of squares of errors under the current number of clusters according to the cluster centers of various categories of leading measuring points; changing the number of clusters k, calculating and obtaining a sum of squares of errors under different numbers of clusters, and then drawing a relationship diagram between the number of clusters k and the corresponding sum of squares of errors, and taking the number of clusters when a decline amplitude of the sum of squares of errors in the relationship diagram suddenly decreases as the number of target clusters; according to the number of target clusters, clustering the leading measuring points to obtain target clusters, and taking the most correlated leading measuring point in the target clusters as one of the first temperature sensitive points outside the physical prototype spindle.

4. The method for predicting the thermal error of the spindle of the CNC machine tool based on twin feature transferring of the virtual-real prototype according to claim 3, wherein the correlation is the correlation between the temperature of each leading measuring point and the thermal error of the physical prototype spindle.

5. The method for predicting the thermal error of the spindle of the CNC machine tool based on twin feature transferring of the virtual-real prototype according to claim 1, wherein S2 comprises:

S21: simulating a sudden change process of the working condition by using a finite element method, and finding the temperature synchronization lag points on the physical prototype spindle corresponding to the first temperature sensitive points outside the physical prototype spindle;

S22: intercepting a multi-condition limited temperature sequence of the first temperature sensitive points outside the physical prototype spindle and the temperature synchronization lag points on the physical prototype spindle, and based on the multi-condition limited temperature sequence, determining the temperature relationship between the first temperature sensitive points outside the physical prototype spindle and the temperature synchronization lag points on the physical prototype spindle by using the grey system theory and denoting the temperature relationship as the first temperature relationship;

S23: fusing the first temperature relationship with the existing thermal error autoregressive distributed lag model, and obtaining the thermal error analysis model of the physical prototype spindle with the temperatures of the temperature synchronization lag points on the physical prototype spindle as the thermal error feature.

* * * * *